United States Patent Office 3,409,419
Patented Nov. 5, 1968

3,409,419
NITRIDES PLUS WEAR-RESISTANT ADDITIVES BONDED WITH IRON, COBALT OR NICKEL
Paul C. Yates, Wilmington, Del., assignor to E. I. du Pont de Nemours and Company, Wilmington, Del., a corporation of Delaware
No Drawing. Continuation-in-part of application Ser. No. 371,778, June 1, 1964. This application Nov. 9, 1966, Ser. No. 593,001
6 Claims. (Cl. 29—182.5)

ABSTRACT OF THE DISCLOSURE

Dense, refractory compositions containing a nitride of titanium, zirconium, hafnium, niobium, vanadium or their mixtures and a thermodynamically wear-resistant additive of aluminum nitride, tantalum nitride or alumina interdispersed with a refractory binder metal selected from among iron, cobalt, nickel and their alloys, are exceptionally effective for use as cutting tools. The nitrides can be partially replaced by other refractory nitrides and carbides so long as at least 20% by volume of the refractory phase remains one of the named nitrides.

CROSS-REFERENCE TO RELATED APPLICATIONS

This application is a continuation-in-part of my copending application Ser. No. 457,468, filed May 20, 1965, now abandoned, which in turn is a continuation-in-part of my then copending application Ser. No. 371,778, filed June 1, 1964, now abandoned. This application is also a continuation-in-part of my copending application Ser. No. 457,461, filed May 20, 1965, now abandoned, which in turn is a continuation-in-part of my then copending application Ser. No. 371,778, filed June 1, 1964, now abandoned, and my then copending application Ser. No. 371,756, filed June 1, 1964, now abandoned.

This invention relates to refractory compositions and is more particularly directed to titanium nitride, vanadium nitride, niobium nitride, zirconium nitride, hafnium nitride or a mixture of them, interdispersed with iron, cobalt, nickel or their alloys and with a thermodynamically stable, wear resistant compound. The invention is further directed to the preparation of these interdispersions, to their use as high temperature refractories and cutting tools, and to the preparation of the nitrides utilized in the interdispersions.

The refractory interdispersions of this invention are exceptionally hard and strong, and display outstanding resistance to chemicals, thermal shock, impact, and high temperatures. Accordingly, they can be used in the numerous ways in which refractory materials are conventionally used. Further, in the form of tool bits and cutting tools, these interdispersions display great resistance to wear, great resistance to cratering, and are resistant to welding to work pieces being cut.

The term interdispersion as used herein describes a relationship of the constituents and is meant to include traditional dispersions in which there is a dispersed particulate phase and a dispersant continuous phase. It is also meant to include those mixtures in which there are two or more phases and some or all of them are continuous and interpenetrating as well as simple mixtures in which the phases are particulate or interrupted and homogeneously intermixed.

According to the present invention, I have discovered that a homogeneous interdispersion of fine particles of titanium nitride, zirconium nitride, vanadium nitride, hafnium nitride, niobium nitride or their mixtures, and a thermodynamcally stable, wear resistant compound in iron, cobalt, nickel, or their alloys, in a manner such that the nitride, wear resistant compound and the metal are mutually dispersed in relation to one another, provides a refractory interdispersion possessing exceptional properties.

The metals suitable for use in the interdispersions of this invention are iron, cobalt, nickel, and their alloys in any proportion with one another. Also limited amounts of other conventional alloying agents can be used with these metals as is more fully explained hereinafter.

These metals with the requisite degree of purity can be obtained from commercial sources or they can be prepared in a conventional manner. A suitable method of preparation and purification is fully set forth hereinafter.

The nitrides suitable for use in this invention, sometimes referred to hereinafter as essential nitrides, are the stable, refractory nitrides of groups III, IVB, and VB of the periodic table, having free energies of formation of more than 30 kilocalories per mole, per gram atom of nitrogen, at 298° Kelvin, and melting points, decomposition points, or sublimation points in excess of 2000° C.

The essential nitrides can be prepared in any conventional manner or by suitable reactions in molten salts. These nitrides can be used alone, in combination with each other, or in mixtures with other stable refractory compounds. Preparation of the nitrides by reaction in molten salts and suitable refractory additives and the criteria for their selection are described in full hereinafter.

The thermodynamically stable wear-resistant compounds suitable for use in this invention are aluminum and tantalum nitrides, and refractory oxides which have a melting point, decomposition point or sublimation point in excess of 1400° C. and a free energy of formation of more than 80 kilocalories per gram atom of contained oxygen at 298° Kelvin. Such oxides include aluminum oxycarbide and the alumina spinels, as well as chemically stable refractory chromites, silicates and aluminates of zirconium, magnesium, calcium, barium, and strontium and the chemically stable refractory oxides of magnesium, zirconium, hafnium, titanium, chromium, beryllium, zinc, calcium, thorium, barium, strontium, silicon, aluminum, cerium, and the rare earth metals. Most preferred wear-resistant compounds for use in the interdispersions of this invention are tantalum nitride, aluminum nitride and aluminum oxide.

The thermodynamically stable wear-resistant compounds of this invention, referred to hereafter as simply "wear-resistant compounds," can be prepared in a conventional manner, or they can be prepared by in situ reactions incidental to the fabrication of the refractory interdispersions of this invention as will be more fully explained hereinafter. When in situ formation is to be employed for the wear-resistant compounds of this invention, the necessary precursors will be added in their elemental form.

The interdispersions of this invention are prepared by intimately intermixing the nitride to be used, in conjunction with the wear-resistant compound or its precursors, all in the form of very fine particles, with the metal to be used, also in the form of very fine particles, until a homogeneous interdispersion is obtained. This homogeneous powder can then be heated and pressed into the desired form and to the desired degree of density. Methods of preparing the powder interdispersions and refractory interdispersions are more fully discussed hereinafter.

The preparation of the powder interdispersions is very important because the outstanding properties of the refractory interdispersions formed therefrom depend to a large degree on the composition of the powder. For example, the homogeneity of the interdispersion of metal, wear-resistant compound and essential nitride, the ultimate particle and crystal size of the nitride, wear-resistant compound, and metal, and the proportional amounts of metal, wear-resistant compound, and nitride are important in achieving the desired properties in the refractory interdispersions of this invention and are largely determined by the powder which is used to form the refractory interdispersion.

The particle size of the metal, wear-resistant compound, and nitride being incorporated into the powder interdispersions of this invention should be as small as is practicable and the preferred maximum particle size is about fifty microns. However, as the desired homogeneity of interdispersion is much easier to attain as the particle size decreases, it is advantageous for the components to have an average particle size of less than ten microns.

If the interdispersed powders are to be used to form very strong refractories like cutting tools and bits, it is preferred that the average particle size of the components be smaller than one micron. Such a particle size adds significantly to the degree of strength, toughness and wear resistance obtainable in the refractory dispersion of this invention and necessary for the use of such compositions as cutting tools.

Refractory interdispersions of this invention can be formed from powdered interdispersions of the nitride, the wear-resistant compound and metal wherein there is from about one to about ninety-nine parts by volume of refractory phase per part of metal. If the amount of refractory material in a powder is below one part by volume per part of metal, the hardness of a refractory interdispersion made therefrom is less than that which is desired. Amounts of refractory material in the powders above ninety-nine parts per part of metal tend to lessen significantly the impact strength of refractories made therefrom.

A preferred amount of refractory phase in the powder interdispersions of this invention is between 3 and 50 parts by volume per part of metal. Restricting the amount of the refractory material to less than 50 parts by volume increases the probability of continuity of the metal within the refractory interdispersion to be formed, and in turn, the probability of outstanding impact resistance, strength and toughness. Conversely, the presence of at least 3 parts of refractory material by volume per part of metal in the powder insures a hardness, wear resistance, and chemical resistance, in a refractory interdispersion made therefrom which makes it very desirable for such refractory uses as cutting tools and bits.

The interdispersions of this invention can contain up to about 95% by volume of the wear-resistant compound, based on the volume of the non-metal components. The wear-resistant compound should not be used in amounts in excess of 95% because the interdispersions must contain at least 5% of one of the essential nitrides to insure nitride bonding between the metallic and non-metallic phase.

A preferred amount of wear-resistant compound is from about 5 to about 50% by volume based on the volume of the non-metal components. Such amounts insure the greatest improvement of the oxidation resistance, wear resistance, and resistance to welding, cratering and sticking in cutting tools made from refractory interdispersions of this invention. It is also preferred to use wear-resistant compounds which are very hard and high-melting such as alumina, aluminum nitride and tantalum nitride when the end use of the refractory interdispersion will be cutting tools or bits.

One of the preferred embodiments of this invention is a powder interdispersion in which the nitride particles are separated from each other by particles of the metal. This retards agglomeration or aggregation of the discrete nitride particles during fabrication of refractory interdispersions of the invention.

Another preferred embodiment of this invention is an interdispersion in which discrete nitride particles are uniformly dispersed in the metal which is present as a continuous matrix separating the discrete nitride particles. Such a distribution of the metal ordinarily provides greatly improved mechanical properties in a refractory interdispersion, making it very desirable for uses such as cutting tools and bits. The term discrete as used herein means individually distinct or composed of distinct parts.

Still another preferred embodiment of this invention is a solid interdispersion in which there is a limited degree of interconnection into a continuous matrix, or three-dimensional network, of the nitride and metal phases of the invention. Such a structure is one in which both the nitride phase and the metal phase are co-continuous with an interpenetrating network of each phase being simultaneously present. Such compositions exhibit most outstanding properties when the individual crystallites of the interpenetrating networks, although connected to one another are quite small and distinguishable and thus discrete. The wear-resistant compound can be present in either of these interpenetrating networks or distributed between them.

However, it must be noted that a distribution of the nitride and metal such as described in the three preceding paragraphs is not essential to this invention since outstanding refractories can be produced in the absence of such a state of distribution.

It is desirable that the essential nitride, the wear-resistant compound, and the metal used all possess a high degree of chemical purity. In particular, it is desirable to avoid the presence in any component, of oxygen, nitrogen, boron, silicon, or sulfur either in uncombined form or as compounds having a lower free energy of formation per atom than the corresponding oxides, nitrides, borides, silicides, or sulfides of iron, cobalt, nickel, or their alloys. Other such elements in a form and in amounts which would react with or dissolve in the metal used during fabrication of the refractory interdispersion in such a manner so as to cause undesirable brittleness of the metal, should likewise be avoided. Examples of such impurities which should be avoided are nickel oxide, iron oxide, cobalt oxide, and large amounts of free carbon.

Limited amounts of alloying agents conventionally used with the primary metals iron, cobalt, and nickel, can be used in the interdispersions of this invention, and are preferably retained as a homogeneous solution with the primary metal, having the crystal structure of the primary metal. Amounts of such alloying agents as chromium, tungsten, molybdenum, manganese and others, which would form intermetallic compounds or new crystallographic phases are preferably avoided. Allowable percentages of such agents can be determined according to this criteria, by consulting appropriate phase diagrams in standard metallurgical texts. The solubility of the alloy metals in the primary metals at 600° C., as reflected in such phase diagrams are ordinarily determinative of the preferred allowable amounts of alloying agents. Molybdenum, tungsten and chromium are the preferred alloying elements as they form solid solutions with iron, cobalt, and nickel, thus improving their mechanical properties.

It should be noted, however, that even when alloying agents are present in excess of the above amounts, a ductile metal phase is present so long as the excess is not too large. Thus, for example, a dilution of a metal phase such as iron with amounts of tungsten up to 30% in excess of the solubility, as determined by the above criteria, is not appreciably deleterious to the properties of a refractory interdispersion of this invention.

Therefore, the working limit for the minor amounts of alloying agents which can be present in the primary metals of this invention can be defined as not more than 30 volume percent, based on the total amount of metal, in excess of that amount which (a) is held as a homogeneous solid solution at 600° C. in the primary metal, and (b) has the crystal structure characteristic of the primary metal of this invention. Preferably the amount of alloying agent will not exceed that amount characterized by (a) and (b) above.

When extreme hardness is desired in the metal to be used in the dispersion, elements such as aluminum, titanium, boron, silicon and carbon can be used in small amounts according to conventional metallurgical practices of heat-treating to precipitation harden such metals. Of these elements, aluminum and titanium are preferred for nickel based alloys and carbon is preferred for ferrous alloys. As has been pointed out, the wear-resistant compounds of this invention can be present in this form, prepared by in situ reaction of added metal with the iron, cobalt or nickel bonding metal.

As was previously stated, the nitrides of titanium, hafnium, zirconium, niobium or vanadium can be used singly or in mixture with one another along with the other refractory additives in the interdispersions of this invention. When nitride mixtures are used it will often be noted that varying degrees of interaction occur between them. This may include the formation of solid solutions, the formation of mixed nitride compounds, or combinations of these. It will be understood that the purposes of this invention are accomplished both when such interactions take place, and in those instances where the several nitrides remain in their original discrete forms. In terms of the properties of the resulting interdispersions such as wear resistance, mechanical properties, and refractory characteristics, simple mixtures, solid solutions, and mixed nitride compounds all behave in a desirable fashion, imparting outstanding characteristics to the compositions of the invention.

Other chemically stable refractory compounds can be used as additives to partially replace the essential nitrides in the interdispersions of this invention. Such chemically stable nitrides as beryllium nitride, magnesium nitride, boron nitride, uranium nitride, cerium nitride and thorium nitride, can be used to replace a part of the aluminum nitride, titanium nitride, tantalum nitride, vanadium nitride, zirconium nitride, niobium nitride, hafnium nitride, or their mixtures. Such chemically stable carbides as titanium carbide, zirconium carbide, tungsten carbide, molybdenum carbide, chromium carbide, tantalum carbide, and niobium carbide, and such chemically stable borides as the monoborides of titanium and zirconium can also be used.

It is essential, however, that the titanium nitride, vanadium nitride, niobium nitride, tantalum nitride, zirconium nitride, hafnium nitride or their mixtures always be present in significant amounts as one of the non-metal components in the interdispersions of this invention. By significant amounts it is meant that the essential nitrides of this invention must be present in amounts of at least 5% by volume of the non-metal phase of the dispersions of the invention, and preferably in amounts greater than 5%. It will generally be noted that the refractory interdispersions of this invention are improved in proportion to the amount of the essential nitrides which are present, at least up to the point at which a continuous phase of nitrides is present in the refractory interdispersions of this invention. The necessary criterion for insuring that the continuous nitride phase will be present is discussed in greater detail hereinafter.

It is also essential, as previously mentioned, that the refractory compounds used as additives not be those which will react with the bonding metal in such a manner so as to embrittle it or which will break down to furnish similar elements whose presence cannot be tolerated for the same reason.

In general, the guideline to be followed in selecting such compounds is that their melting point should exceed 1400° C., while their free energies of formation from the constituent elements should be greater than the free energies of the compounds which would be formed by disproportionation of the additive compound, and reaction of the constituent element with the bonding metal.

For example, tungsten carbide is a satisfactory additive when employed with the nickel or cobalt-bonded compositions of the invention because its free energy of formation substantially exeeds the combined free energies of the nickel or cobalt carbides, and the nickel or cobalt, tungsten alloys that would result from its disproportionation and the reaction of its constituents with nickel or cobalt. Similarly, titanium carbide is a suitable additive for an iron-bonded composition of the invention, since its free energy of formation exceeds the combined free energies of formation of the titanium-iron alloy and iron carbide which would result from its disproportionation and reaction with the iron-bonding metal of the invention. Any standard reference book which discloses the free energies of formation of metal alloys, intermetallic compounds, and refractory carbides, nitrides, and borides can be consulted for the necessary information to apply this criterion as a guide.

It should be noted, however, that small amounts of additives, even including those which may react by disproportionation are not absolutely precluded from the compositions of the invention. When such reactions can occur, however, it is necessary to restrict the amount of any such additives to quantities which are small with respect to the bonding metals of the invention in the particular composition employed. Such restriction prevents the tying up of an amount of the bonding metal which would reduce the strength of the refractory interdispersion and make it undesirably brittle.

The amount of refractory additive to be used in conjunction with, or as partial replacements for, the essential nitride of the invention, will preferably be less than an amount sufficient to form an interpenetrating network of the additive and prevent the formation of a continuous network of the essential nitrides.

Formation of a continuous network does not depend solely on the relative volume fractions of the nitride and the additive, since it is also influenced to a considerable degree by the particle size or crystallite size of the nitride starting powders relative to the starting powders of the additive particles. Thus, if coarse-grained particles of the additive are employed, as for example 10 micron sized particles, in conjunction with very finely divided particles of the essential nitrides of the invention, for example, in the size range of 20 to 100 millimicrons, an interpenetrating network which is essentially bonded together by the nitrides of the invention will be formed. This is true even though the nitrides are present in amounts as small as 5% of the non-metal phase.

As it is generally preferred to use additives having a particle size of less than a micron, somewhat larger amounts of essential nitrides, on the order of 20% by volume of the non-metal phase, are usually required to achieve the desired continuity. Similarly, if the particle size of the essential nitrides to be used are larger than 20 millimicrons, it can become necessary to use the nitrides in amounts as great as 50% by volume of the non-metal phase, or more to ensure that the preferred continuous ceramic phase bonded by the nitrides of the invention is formed.

It should be noted that there are reasons other than the desirability for forming a continuous nitride phase for preferring, in general, rather large quantities of the essential nitrides of the invention in the most preferred compositions. While the mechanism is not fully understood, it appears that the nitrides of the invention combine to an exceptional degree the properties of resistance to welding or sizing to metals being cut when the compositions of the invention are employed as cutting tips, with the ability to form strong and stable bonds with the bonding metals of the invention. Thus, it is preferred that the essential nitrides be present in amounts greater than 20% by volume of the non-metal phase, and it is most preferred that they be present in amounts in excess of 50% by volume of the non-metal phase.

A general criterion to follow for the formation of the preferred type of structure in which a continuous ceramic network of the nitrides of the invention is formed, is that the product of the volume fraction and the surface area per unit volume of the essential nitrides be approximately equal to, or preferably in excess of, the product of the volume fraction and surface area per unit volume of the additive to be employed. Proper attention to this criterion in selecting compositions will ordinarily result in the preferred type of structure.

Since the structure is also determined to some extent by the rates of crystal growth which occur during fabrication, it is not necessary to apply the above criterion in a completely rigid fashion. In particularly favorable circumstances, when the rate of growth of the nitride network under the fabrication conditions employed greatly exceeds the rate of growth, or the recrystallization rate of the additive to be employed, amounts of the essential nitrides of the invention considerably less than those corresponding to the criterion just discussed may be employed, and the preferred nitride-bonded interpenetrating ceramic network of the non-metallic phase will still be formed.

PREPARATION OF THE METALS

As stated previously, the metals which can be used in the interdispersions of this invention are iron, cobalt, nickel, and their alloys. A suitable method of preparation of these metals for incorporation into the interdispersions of this invention is hydrogen reduction of the corresponding metal oxide or carbonate at a temperature of from about 600° C. to about 1200° C.

In the preparation of the metals to be used in this invention, it is best to employ as low a temperature as is consistent with a reasonably rapid completion of reduction. This is done to prevent excessive sintering and agglomeration of the particles of metal being formed.

The reduction will be followed by milling operations in an inert liquid medium. In this manner the metal can be obtained in a powder form, preferably having a specific surface area greater than one square meter per gram, which makes it convenient for its subsequent interdispersion with an essential nitride. It is desirable that the grinding media used in the milling operations be constructed of the same metal as that being prepared so that a foreign material is not introduced by attrition of the grinding media, or that they be constructed of extremely wear-resistant material such as cobalt-bonded tungsten carbide to minimize possible contamination.

PREPARATION OF THE NITRIDES

The nitrides to be used in this invention can be prepared by any conventional method, by nitriding the corresponding finely milled hydrides or metallic elements as described in my copending application Ser. No. 457,467, filed May 20, 1965, now abandoned or by a suitable reaction in a molten salt such as described below.

Techniques which have been conventionally employed in the art to prepare refractory nitrides include, for example, reactions between the corresponding metal halides and ammonia, followed by heating to form the nitride. For example, titanium tetrachloride may be reacted with liquid ammonia to form a titanium amidochloride. This can be heated in a stream of ammonia gas to a temperature of approximately 400 to 500° C., whereupon titanium nitrogen chloride will be formed. Further heating at a temperature in the range of 400° C. to as high as is desired, again in the presence of ammonia, nitrogen, or nitrogen plus hydrogen, will result in the formation of the desired titanium nitride. Similar routes are effective in the case of the other nitrides of this invention, such as zirconium nitride, and hafnium nitride.

The nitrides may also be formed by the carbon reduction in the presence of nitrogen of the corresponding metal oxides in a manner which is set forth in the literature. Conventional methods for the preparation of the essential nitrides of this invention are disclosed, for example, in a chapter entitled, "Nitrides," by John M. Blocher, Jr., which is Chapter VIII of a book entitled, "High Temperature Technology," edited by I. E. Campbell, John Wiley & Sons, N.Y., 1956.

A preferred method of preparing the nitrides of the invention, which results in nitride particles of an average size of less than a micron, is by suitable reactions in a molten salt.

Suitable salts for a salt bath to be used in this reaction can be, for example, the alkali and alkaline earth halides, particularly those which are thermally and thermodynamically stable such as the chlorides and fluorides of sodium, potassium, lithium, calcium, magnesium, and barium.

A second component of the molten salt bath will be a halide or oxide of titanium, zirconium, aluminum, niobium, vanadium, tantalum or hafnium. This component is the source of the metal for the nitride which is to be prepared.

A stoichiometric amount of an alkali or alkaline earth nitride, such as the nitrides of sodium, lithium, calcium, magnesium and the like, is added in small increments to the molten bath. Incremental addition of the nitride avoids a too vigorous reaction. The reaction mixture is vigorously stirred during the nitride addition to insure a complete reaction.

The temperature of the reaction should be between the melting point of the salt mixture and 1200° C. Generally speaking, a temperature of at least 450° C. is desirable while a range of from 600° C. to 1100° C. is most preferred for these reactions.

The product of the reaction can be recovered from the molten salt bath by quenching it and dissolving the salt and reaction by-products in a solvent which shows a high preferential solubility for the salt and the by-products, but which does not substantially or rapidly attack the refractory nitrides. Suitable solvents are distilled water, alcohols, and water mixed with acids, such as hydrochloric and acetic acid.

If desired, the nitride thus recovered can be additionally purified by reduction in an atmosphere of cracked ammonia.

The nitride can be recovered from the molten salt in some instances by distilling off the salts and by-products at a temperature of from 1100° C. to 1400° C. under high vacuum. This procedure avoids exposing the nitride to oxygen, eliminating the need for further reduction with ammonia.

In the event that some aggregation occurs during the synthesis of the nitride, it is posisble to disaggregate the particles such as by ballmilling in a nonreactive solvent.

Following the milling, it may be desirable to purify the nitride as by acid treatment, to remove impurities picked up during the milling through attrition of the grinding media. If it is desired to achieve a very low oxygen level, the nitride can be reduced in an atmosphere such as cracked ammonia to remove any oxygen picked up during the purification procedure.

To avoid the necessity for purification, it is preferred to use a grinding media such as the balls, of the same metal as that with which the nitride is eventually to be interdispersed.

PREPARATION OF THE WEAR-RESISTANT COMPOUNDS

The wear-resistant compounds of the invention can be prepared in any of the variety of ways which are well known in the art. Those techniques which furnish the resulting compound in an extremely finely divided form are preferred.

For example, refractory aluminum oxide compounds suitable for use in this invention can be prepared by calcining colloidal dispersions of alumina prepared by precipitation of the hydroxide or hydrous oxide in aqueous solution. They can also be prepared by oxidation or hydrolysis at elevated temperature of a volatile aluminum halide. In general, they can also be prepared by any of a variety of techniques well known in the art for preparing extremely finely divided, preferably colloidal, alumina particles.

Aluminum nitride and tantalum nitride can be prepared in a molten salt bath as described above under preparation of the nitrides.

Aluminum oxycarbide, suitable for use in this invention, can be prepared by a controlled carbon reduction of aluminum oxide, or by an in situ reaction between finely divided carbon black and alumina in the further processing of the compositions of this invention. If this technique of synthesis is employed, it is necessary to heat the constituents at a temperature between 1200 and 1500° C. for a sufficient period of time to eliminate the carbon monoxide reaction by-product prior to fabricating powder interdispersions containing aluminum oxycarbide into one of the dense compositions of the invention.

In general, however, the wear-resistant compounds can be prepared by the methods conventionally used for preparation of nitrides and oxides with emphasis being placed on obtaining a product of uniformly fine particle size.

PREPARATION OF THE POWDER INTERDISPERSIONS

The interdispersions of the metals with the wear-resistant compounds, the nitrides, and other refractory compounds if desired, in the form of a powder, make up one of the preferred forms of this invention. The titanium nitride, vanadium nitride, niobium nitride, zirconium nitride, hafnium nitride or their mixtures, the wear-resistant compounds, and such other refractory compounds as may be desired, can be interdispersed with the metal powder in any convenient manner such as by mixing in a hydrocarbon solvent in a colloid mill or a ballmill. Preferably the hydrocarbon solvent will be one of sufficiently high boiling point and flash point to avoid a fire hazard. Ballmilling times of from 24 to 500 hours have been found satisfactory.

Since the nitride constituent of the invention is difficult to purify, it is desirable to employ grinding media, such as the balls, of the same metal as that with which the nitride is being interdispersed, or of material which is extremely resistant to attrition such as cobalt-bonded tungsten carbide. This insures that foreign materials will not be introduced as a result of the attrition of the grinding media. The mill can be one which is coated with an elastomeric material such as neoprene, which is not softened or attacked by the grinding fluid. Milling conditions, such as the volume loading of the mill and the rate of rotation, should be optimized as hereinafter illustrated in the examples.

After milling the mixture to homogeneity, the grinding fluid can be removed by washing with a suitable solvent such as hexane and drying under vacuum. The milled powders absorb water or oxygen rapidly and must be kept out of contact with air and moisture. The powders of this invention are therefore handled in an inert atmosphere but if contamination occurs, the powders can be reduced to remove such impurities. This reduction will preferably be performed below 1000° C. with very dry pure hydrogen.

The average size of the particles can readily be determined by examination of the interdispersed powders using a light microscope for larger particles and an electron-microscope for smaller particles. By average particle size is meant the number average of the particle diameters.

In the preferred powder interdispersions the surface area per cubic centimeter of solids is from about 3 to 180 square meters. The surface area per cubic centimeter can be determined by multiplying the density of the solids of the interdispersion by the specific surface area as measured by standard nitrogen absorption techniques.

PREPARATION OF REFRACTORY INTERDISPERSION

The interdispersions of the metals with the nitrides, the wear-resistant compounds, and such other refractory compounds as may be desired, in the form of a solid, make up another preferred form of this invention. A representative method for forming these interdispersions is by pressing and heating the powder interdispersions to nearly theoretical density. The pressing and heating may be done sequentially as in cold pressing and sintering, or it may be done simultaneously as in hot pressing, hot extrusion, hot rolling, hot forging, or hot coining. Pressing and heating can be conducted in the presence of a nitrogen atmosphere if desired. The preferred method of fabrication is by hot pressing.

The pressing temperature will depend on the amount of metal employed, its state of subdivision, and the composition and state of subdivision of the nitrides and wear-resistant compounds. Generally speaking, the temperatures will be at least $6/10$ of the melting point, expressed in degrees Kelvin, of the metal component and should be at least 1000° C. and not more than 2000° C. The larger the amount of nitride being used, and the lower the pressure being employed, the higher should be the fabrication temperature. When hot pressing is employed, heat and pressure can be applied similtaneously or sequentially, but it is preferred to delay application of the pressure until the goal temperature is reached. It is also preferred to use a temperature of from about 1350° C. to about 2000° C.

The time the compact spends at the highest temperature used and under the full pressure employed will vary according to the temperature and method of fabrication used and the composition and state of interdispersion. Generally, the time will vary from a few seconds in hot extrusion to one to 30 minutes in hot pressing and from 10 minutes to several hours when fabrication is by cold pressing and sintering.

The pressure employed will also vary according to the temperature and method of fabrication used and the composition and state of interdispersion, but will generally range from 500 pounds per square inch to more than 6000 pounds per square inch.

The applicable combinations of pressing conditions will hereinafter be more completely illustrated in the examples.

An alternate method of interdispersing the components with one another, prior to preparation of a solid interdispersion, is to precipitate the metal to be used on previously prepared fine particles of the nitride to be used, and of the wear-resistant compound to be used. The metal can be precipitated, for example, as a hydrous oxide or hydrous metal carbonate and the resulting homogeneous mixture can then be reduced in an atmosphere rich in both nitrogen and hydrogen, such as cracked ammonia. This allows the reduction of the oxides which are present without effecting a change in the nitrides being used.

Similarly, an oxide precursor of the nitride to be used, such as titanium dioxide as a precursor for titanium nitride, can be coprecipitated with the hydrous metal carbonate or hydrous metal oxide and the desired wear-resistant compound. Sufficient carbon black can then be mixed with the mixed oxide coprecipitate to reduce the nitride precursor, and the whole composition can then be heated to a temperature of from 1100° C. to 1500° C. in cracked ammonia to produce a nitride, metal, wear-resistant compound composition of this invention. This composition can be ballmilled, if desired, to reverse any aggregation which may have occurred as a result of the heating and reduction.

After a refractory interdispersion has been prepared, the particle sizes of the components can be determined by making a metallographic section, etching the section with an appropriate chemical, and examining the surface with a microscope, using an optical microscope or an electronmicroscope, as is appropriate. Where an electronmicroscope is to be used, a conventional carbon or plastic replica of the surface is made first and the measurements are then made on the replica.

The average particle size of the components of a refractory interdispersion of this invention should be less than 50 microns. In the more preferred embodiments of this invention the average particle size will be less than 10 microns, and in the most preferred embodiments of the invention the average particle size will be less than one micron.

The nature of the interdispersion of the nitride and the wear-resistant compound with the metal and the dimensions of the metal in the refractory interdispersions of this invention will be a function of the fabrication conditions and the volume fraction employed as well as the nature of the starting material. Some clumping or aggregation of nitride particles will occur, but as mentioned previously, one of the preferred embodiments of the invention is that in which most of the nitride particles are separated from each other by some of a continuous metal matrix giving a homogeneous and uniform interdispersion of discrete nitride particles.

More specifically, it is desired that the homogeneity of interdispersion be such that the distribution of the nitride and metal in the refractory interdispersion is on a 1000 square micron scale, and more preferably on a 100 square micron scale. By this is meant that a metallographic or an electron micrographic scan, as conventionally used in metallurgy to examine the structure of alloys, will show both the nitride and metal present within a square region no greater than 32 microns on edge, and preferably no greater than 10 microns on edge. Moreover, in the most preferred embodiment of this invention each square region 10 microns on edge which is examined will exhibit substantially the same structural characteristics as every other such region in the interdispersion within conventional statistical distribution limits.

Also as stated previously one of the most preferred embodiments of this invention, is a refractory interdispersion in which there is a cocontinuous network of very finely divided, discrete crystallites of both the metallic phase and of the non-metallic phase, in which the constituents of each phase have crystallite sizes or particle sizes less than 1 micron, and in which the essential nitrides of the invention comprise the primary bonding units of the non-metallic phase.

The presence of a continuous phase of the metal in preferred refractory interdispersions of this invention can be most simply determined by measuring the electrical resistivity of the interdispersion. Since the refractory compounds used in this invention have a higher electrical resistance than do iron, cobalt, nickel, or their alloys, if the refractory compounds are distributed so as to interrupt the continuity of the metal, the electrical resistivity of the refractory interdispersion will be from 10 to 100-fold higher than if the metal is continuous. Conversely, if one of the metals is distributed as a continuous phase throughout a refractory interdispersion of this invention, the electrical resistivity of the interdispersion will be inversely proportional to the volume fraction and thickness of the continuous pathway of the metallic constituent. Appreciable continuity of the metal throughout a refractory interdispersion of this invention is indicated by a specific electrical resistivity of less than about one ohm centimeter; in the preferred refractory interdispersions the specific electrical resistivity will be less than about 0.05 ohm centimeter; and in the most preferred refractory interdispersions the specific electrical resistivity will be less than 0.1 milliohm centimeter.

It is usually possible by inspection of suitably prepared metallographic specimens of the compositions of the invention to determine and demonstrate which of them contain the preferred interpenetrating nitride network. If the crystallite size of the various components in the refractory interdispersion is of the order of a micron or larger, the existence of such a network may be directly observed in an optical microscope, using a magnification of 1000 or 2000-fold. If some or all of the various component crystallities are substantially smaller than a micron in size, the refractory interdispersion can be examined by electron micrograph replica techniques, using conventional procedures.

The refractory interdispersions of this invention have a density in excess of 90% of the theoretical density and preferably in excess of 95% of the theoretical density. Those refractory interdispersions which are to be put to such uses as cutting tools most preferably have a density in excess of 98% of the theoretical density and are substantially free from pores when examined by metallographic methods. The theoretical density is calculated by assuming that the specific volumes of the individual components are additive.

The density of the refractory interdispersions of this invention can be determined by any technique for determining the simultaneous weight and volume of the composite. Most simply the weight can be determined with a sensitive analytical balance and the volume can be determined by mercury or water displacement.

It should be understood that the previously discussed aspects of the structure, purity, density, homogenity, and metal continuity of the refractory interdispersions of this invention are each contributing factors toward achieving improved properties in such interdispersions. However, the most outstanding results are obtained when all of the characteristics are simultaneously present. Such refractories, in the form of cutting tools or bits, constitute the most preferred embodiment of this invention.

Such a refractory composite is one in which discrete nitride particles, discrete particles of the wear-resistant compounds and discrete particles of other refractory compounds is used, having an average size of less than a micron, are homogeneously interdispersed as a co-continuous phase with a three-dimensional network of iron, cobalt, nickel, or their alloys so that the uniformity of distribution is on a scale of less than 100 square microns. The average size of the metal crystals in the composite is less than one micron and continuity of the metal is such that the composite has an electrical resistivity of less than 0.1 milliohm centimeters. The amount of refractory compounds used is from 3 to 50 parts by volume per part of metal, the amount of the wear-resistant compound is from 5 to 50% by volume of the non-metal phase, and the density of the composite is in excess of 99% of the theoretical density. The most preferred metals for such a composite are cobalt and an alloy of nickel with 15 weight percent molybdenum. Among the preferred mixtures of refractory compounds would be one containing about 50 to 75% by volume, titanium nitride, about 15 to 25% by volume aluminum nitride, or alumina, and about 8 to 18% by volume tungsten carbide, based on the volume of the total refractory phase.

The refractory interdispersions of this invention are hard, strong, thermal shock-resistant and corrosion-resistant. They display high electrical and thermal conductivity and demonstrate superior resistance to erosion. These properties make them particularly useful for structural applications, for corrosion and erosion-resistant chemical process equipment, for high temperature electrodes, for dies, thread guides, bearings and seals.

However, as stated before, the refractory interdispersions of this invention are most particularly useful as tool bits in cutting, grinding, shaping, drilling, and punching very hard metal or alloys at high speeds. This is due to their great impact strength and thermal conductivity and their unusual resistance to thermal shock, wear, cratering and welding.

In order that the invention may be better understood, the following illustrative examples are given, wherein parts and percentages are by weight unless otherwise indicated.

Example 1

Forty parts of a finely divided form of gamma alumina, having a surface area of about 200 m.$^2$/g., and consisting of relatively non-aggregated spheres, are mixed with 400 parts of an aluminum flake pigments having an oxygen content of 1.43%. To this mixture is added 5.5 parts of a dispersion of lithium metal in paraffin wax, the content of lithium metal being approximately 37%. These are loaded into a steel ball mill which is filled to 40% by volume with steel balls. To this are added a sufficient amount of "Soltrol" 170, an isoparaffinic hydrocarbon solvent having a flash point of 185° C., to cover the steel balls. The loading of steel balls is 9288 parts and 1275 parts of the high boiling hydrocarbon oil are used. The mill is closed and rotated on rollers running at a speed of 60 r.p.m. for a period of four days. A sample of about 150 parts of this material is separated from the steel balls and the hydrocarbon solvent and loaded into a carbon boat and placed in an alumina tube, which, in turn, is placed in an electric furnace. The temperature is raised to 1450° C. while maintaining an atmosphere of cracked ammonia and $N_2$ in the tube over a period of about 3 hours, and held at that temperature for 2 hours.

The product at this stage consists of a very finely divided aluminum nitride powder having a surface area of 6.6 m.$^2$/g. and a crystallite size by X-ray line broadening of 210 mµ.

After determination of the surface area, this material is placed back into the carbon boat and fired for an additional 8 hours under a nitrogen atmosphere at 1450° C. A chemical analysis shows it to contain 65% aluminum, 2.43% oxygen, and 30.72% nitrogen. Its surface area is 2.0 m.$^2$/g. X-ray line broadening measurements show this material to consist of aluminum nitride having a crystallite size of approximately 265 millimicrons.

Thirty-one and nine tenths parts of this aluminum nitride powder and 1.53 parts of a 1 micron size, finely-divided, powder mixture consisting of 99 weight percent metallic iron and 1% metallic boron are milled in a rubber-lined steel ballmill filled to 40% of its volume with ¼" diameter-¼" long cylindrical rods of tungsten carbide-6% cobalt, and also containing 270 parts of an isoparaffinic hydrocarbon oil having a flash point of 185° F. This mill is placed on rubber-lined rollers and rotated at a speed of 60 r.p.m. for a period of 48 hours.

The oil and iron-boron-aluminum nitride intimately mixed, finely divided powders are separated from the tungsten carbide-cobalt rods, and the mixed powder separated from the oil by decantation. The powder is then washed six times with 660 part portions of normal hexane which completely free it of the hydrocarbon oil. The resulting finely divided dispersion is dried overnight in a vacuum oven. Chemical analysis shows this powder to consist of 49 parts by volume of aluminum nitride per part by volume of a metal which is 99 percent iron and 1 percent boron.

Fifteen parts of this powder are placed in a cylindrical carbon mold and hot pressed in an induction-heated, vacuum, hot press under a pressure of 4000 p.s.i. at a top temperature of 2000° C. and with a holding time of one minute under these conditions. The sample is cooled, removed from the press, and cut into test pieces for evaluation of its density and mechanical properties.

Cutting is performed by a thin diamond saw blade, using a wafer cutting machine for this purpose.

It is found that the transverse rupture strength of this refractory interdispersion is 51,300 p.s.i., its hardness on the Rockwell A scale is 85.2, and its impact strength is 5.1 ft.lbs./in.$^2$. Its density is 3.31 g./cc., which represents 99% of the theoretical density to be expected of this composition, assuming that the specific volume of the various constituents is additive.

A cutting tool insert is machined from this refractory interdispersion and is found to be an exceptional cutting tool which shows very little wear on 4340 grade steel using a depth of cut of ¹⁄₁₆" and a cutting speed of 1500 surface feet per minute. The edge (or flank) wear and the cratering tendencies of this composition are extremely low.

Example 2

Nineteen and five hundredths parts of the aluminum nitride of Example 1 and 17.1 parts of a 1 micron particle size powder of titanium nitride, 6.76 parts of a finely divided nickel metal powder, and 1.69 parts of a finely divided chromium metal powder are mixed together. They are milled, recovered from the mill, purified, and dried as described in Example 1. Twenty parts of this interdispersion are pressed in a hardened steel mold, under a pressure of 10,000 p.s.i., to give a green billet. This billet is sintered for 4 hours at a temperature of 1325° C. in an alumina tube maintained under a high vacuum.

The resulting refractory interdispersion contains about 5.85 parts by volume of aluminum nitride and about 3.15 parts by volume of titanium nitride per part by volume of an alloy which is 80 percent nickel and 20 percent chromium. The refractory phase thus contains 65 volume percent aluminum nitride and 35 volume percent titanium nitride.

This refractory interdispersion has a density of 4.03 g./cc., which is 90.5% of the theoretical expected density of 4.45 g./cc. Its rupture strength is 63,000 p.s.i., its hardness 60.7 on the Rockwell A scale, and its impact strength 11.1 ft.lbs./in.$^2$.

Example 3

Twelve and seven tenths parts of the aluminum nitride of Example 1, 18.3 parts of a finely divided zirconium nitride powder (having particles smaller than 10 microns), 33.4 parts of finely divided cobalt metal powder, and 5.9 parts of finely divided tungsten metal powder are mixed. After milling, recovery, purification and drying as described in Example 1, 28 parts of this interdispersion are pressed in a hardened steel die under a pressure of 10,000 p.s.i. The resulting green billet is then inserted in an alumina tube in an electric furnace, and heated to 1600° C. under a high vacuum, and held at this temperature for 1 hour.

The resulting refractory interdispersion of the invention consists of 1.12 parts by volume of aluminum nitride and 0.74 part by volume of zirconium nitride per part by volume of a cobalt-tungsten alloy having a ratio of 85% cobalt to 15% tungsten. The refractory phase thus contains 60 volume percent aluminum nitride and 40 volume percent zirconium nitride.

The density of this refractory is 6.48 g./cc., which represents 92% of the 7.04 g./cc. theoretically expected of it. Its rupture strength is 55,000 p.s.i., its Rockwell A hardness is 63.8, and its impact strength is 10 ft.lbs./in.$^2$.

Example 4

This example describes the preparation of particulate titanium nitride by a reaction between titanium trichloride and calcium nitride in a bath of molten calcium chloride. It further describes the preparation of a refractory dispersion of iron, aluminum nitride and titanium nitride.

The apparatus used in preparing the titanium nitride consists of a cylinder 4" in diameter and 11" high, fabricated from ¹⁄₁₆" sheet "Inconel" (80% of nickel, 13% chromium, 7% iron). The cylinder is contained in a ¼" wall "Duraloy" (65% iron, 20% chromium, 15% nickel) pot provided with a flange to which is bolted a tightly fitting head. Two taper joints are attached to the head.

Retort shaped glass bulbs are inserted in the taper joints and the solid powder reactants are dispensed from these bulbs by rotating them in the joints so that the powder spills over into the reactor. A stirrer, made from ½" "Inconel" tube with flat blades of "Monel" welded to the tube, enters the reactor via an asbestos packed bearing. The temperature in the reactor is recorded by means of a thermocouple inserted inside the hollow stirrer shaft. An electrically heated "Calrod" furnace surrounds the pot, the temperature of the furnace being recorded by means of another thermocouple.

Five hundred parts of anhydrous calcium chloride are charged to the reactor and the air in the system is displaced by passing argon, previously gettered over finely divided titanium metal at 800° C., into the reactor, the gas exit being connected to a bubbler. The calcium chloride is melted and the melt brought to 875° C. with good agitation by the mechanical stirrer. Aliquots of the mixed reactants consisting of 15.43 parts of titanium trichloride and 13.83 parts of calcium nitride are charged at 5 minute intervals to the reactor by manipulating the addition bulb and controlling the rate of addition by observing the heat evolved, as recorded by the stirrer thermocouple. The temperature is maintained in the range of 875 to 925° C. during the reaction, the addition being completed over a period of 80 minutes. A total of ten aliquots are added during this time. The melt is kept at 875 to 900° C. with stirring, for a total period of one hour. Then, after raising the stirrer from the melt, the salt is allowed to cool to room temperature under argon. The solidified salt cake is broken up and pulverized.

The crushed salt cake is stirred with ice water, until the calcium chloride is dissolved. The product is then washed until it is free of chloride ion by suspending in distilled water and centrifuging through a Sharples Super-Centrifuge. This requires five washes, using 10,000 parts of water per wash. After the product is free of chloride ion, it is dried in a vacuum oven to give a very finely divided titanium nitride colloidal powder. 118 parts representing 96% of the theoretical yield for this reaction are recovered. Examination of the product by X-ray diffraction indicates it to be titanium nitride, and chemical analysis shows that it contains about 1% oxygen as a major impurity, along with traces of iron, chromium, and nickel in the parts per million range, presumably originating from the "Inconel" equipment used for the synthesis.

X-ray line broadening measurements and nitrogen surface determinations indicate the crystal size of the titanium nitride crystals to be approximately 55 millimicrons.

Twenty-six and six tenths parts of the titanium nitride are loaded in a rubber-lined steel ballmill containing 6.85 parts of aluminum nitride and 23.40 parts of a stainless steel powder, having a particle size of about 10 microns and a composition of 74% iron, 18% chromium, and 8% nickel. This is milled under 270 parts of hydrocarbon oil, using 2600 parts of stainless steel balls for 24 hours.

The resulting intimate interdispersion containing about 1.63 parts by volume of titanium nitride and about 0.7 part by volume of aluminum nitride per part by volume of stainless steel is recovered in the fashion described in previous examples. The refractory phase consists of about 70 volume percent titanium nitride and 30 volume percent aluminum nitride.

Twenty parts of this interdispersion are cold pressed in a hardened steel die under a pressure of 10,000 p.s.i. and this compact is sintered at a temperature of 1900° C. for one hour.

The resulting refractory interdispersion of the invention has a rupture strength of 70,000 p.s.i., an impact strength of 12 ft.lbs./in.², and a density of 5.3 g./cc. This represents 92.5% of the theoretical density for this composition.

This refractory exhibits excellent corrosion and erosion resistance to a variety of chemicals, and is also useful as a high temperature structural material. In addition, it is useful as a cutting tool for machining cast iron.

Example 5

One hundred and eighteen parts of finely divided titanium nitride, 24 parts of finely divided cobalt, and 8.3 parts of finely divided aluminum nitride are placed in a one quart steel ballmill containing 350 parts of a high boiling hydrocarbon solvent and 3500 parts of ¼" long, ⅛" diameter cylindrical rods of 94% tungsten carbide and 6% cobalt. The mill is then rotated at 60 r.p.m. for a period of 64 hours. The mixture is separated from the oil by decantation and the remaining oil is then removed by washing in hexane in a nitrogen atmosphere. The hexane is then removed by vacuum distillation. The resulting powder contains about 8 parts by volume titanium nitride and about 1 part by volume aluminum nitride per part by volume of cobalt. The refractory phase is thus composed of about 89 volume percent titanium nitride and 11 volume percent aluminum nitride.

Under a nitrogen atmosphere, 23 parts of this powder is placed in the cavity of a cylindrical carbon mold which can be inserted in the hot zone of an induction coil and held there by two carbon rams which are in turn connected to the platens of a hydraulic press. The mold and rams are enclosed through vacuum tight seals within a water-cooled cylindrical steel shell which is evacuated by a vacuum pump. Temperature control of this equipment is effected by means of a radiation pyrometer, the output of which operates a controller, which in turn controls the power supply to the induction furnace. After evacuation of the furnace, the temperature of the carbon mold is increased to 1500° C., and a pressure of 4000 p.s.i. applied. The temperature is then raised to 1600° C., still maintaining the pressure at 4000 p.s.i. and the sample is held at this temperature for 2 minutes, after which the power is shut off and the sample removed from the furnace cavity.

The resulting disc is cut into pieces for testing its transverse rupture strength, its Rockwell A hardness, its density and its performance as a cutting tool for cutting metals and alloys. The average transverse rupture strength obtained is 178,000 p.s.i., its Rockwell A hardness is 91.7 and its density is 5.70 g./cc.

Part of the disc is fashioned into a standard cutting tool insert and its wear rate and crater depth determined on a high speed lathe. The depth of cut is 0.050", the feed is 0.010" and the speed is 1000 surface feet per minute. These conditions are referred to as the A conditions. The metal used is 4340 steel.

After three minutes cutting time under the A conditions, the wear on the flank of this cutting tool is only 13 mils and the crater depth is 1 mil.

Example 6

One hundred-seven and one-half parts of finely divided titanium nitride, 25.2 parts of finely divided cobalt, and 17.3 parts of finely divided aluminum nitride are milled together and the dry powder recovered as in Example 5. This powder contains about 7 parts by volume titanium nitride and about 2 parts by volume aluminum nitride per part by volume of cobalt. The refractory phase thus contains about 78 volume percent titanium nitride and about 22 volume percent aluminum nitride.

Twenty-two parts of this powder are hot pressed and the resulting disc cut up and tested as in Example 16. The average value of the transverse rupture strength is 124,000 p.s.i., the Rockwell A hardness 91.6, and the density is 5.75 g./cc.

After 3 minutes cutting time under the A conditions specified in Example 5, the cutting tool insert fashioned from this disc showed a flank wear of 16 mils and a crater depth of 1 mil.

Example 7

Ninety-six and three-tenths parts of finely divided titanium nitride, 27.0 parts of finely divided aluminum nitride, and 26.7 parts of a finely divided metal alloy the composition of which is 90 percent nickel and 10 percent molybdenum are placed in a ballmill and milled as in Example 5, except that the milling time is 136 hours. The resulting mixture is then washed free of oil, and dried as in Example 5. The powder contains about 6 parts by volume titanium nitride and about 3 parts by volume aluminum nitride per part by volume of metal. The refractory phase thus contains about 67 volume percent titanium nitride and about 33 volume percent aluminum nitride.

Twenty-five parts of this powder is placed in a carbon mold and hot pressed as in Example 5, except that the temperature is increased to 1400° C. and a pressure of 4000 p.s.i. applied. While maintaining this pressure the temperature of the carbon mold is then raised to 1800° C. and the sample is maintained at this temperature for 2 minutes, after which the power is shut off and the sample removed from the furnace cavity.

The resulting disc is cut up and tested as in Example 5. The average transverse rupture strength is 183,000 p.s.i., the Rockwell A hardness is 91.3 and the density is 5.66 g./cc.

A standard cutting tool insert is fashioned from part of this disc and tested on a high speed lathe under the A conditions specified in Example 5. After 3 minutes cutting time the flank wear on this insert is only 6 mils and the crater depth is 0.75 mils. In addition, the insert is tested under a different set of conditions which are referred to as the B conditions: depth of cut is 1/16″, feed is 0.020″ and the speed is about 300 surface feet per minute. The material being cut is again 4340 steel. After 40 minutes cutting time under the B conditions the insert shows a flank wear of 4 mils and a crater depth of 1.5 mils.

Example 8

One hundred and twenty parts of finely divided titanium nitride, 22 parts of finely divided aluminum nitride, 31 parts of finely divided cobalt and 27 parts of finely divided tungsten carbide are ballmilled together as in Example 5 with the exception that the milling time is 99 hours.

The mixture is transferred from the ballmill to a resin kettle under a nitrogen atmosphere and the solids are allowed to settle. Most of the oil is then removed by decantation and the remaining oil is removed by vacuum distillation. The resulting powder contains about 6.4 parts by volume titanium nitride, about 2.1 parts by volume aluminum nitride and about 0.5 part by volume tungsten carbide per part by volume of cobalt. The refractory phase thus contains about 71 volume percent titanium nitride, 23 volume percent aluminum nitride, and 6 volume percent tungsten carbide.

Twenty-five parts of this powder is placed in a carbon mold and hot pressed as in Example 5 except that the temperature is first increased to 1850° C. and maintained for 11 minutes. A pressure of 4000 p.s.i. is then applied and the sample maintained under this pressure at 1850° C. for 2 minutes.

The resulting disc is cut for testing as in Example 5. The average transverse rupture strength is 176,000 p.s.i., the Rockwell A hardness is 90.8, and the density is 5.26 g./cc. A standard cutting tool insert is fashioned from part of the disc and is tested under the A conditions of Example 5 on a high speed lathe. After 3 minutes cutting time the flank wear on this insert is 6 mils and the crater depth is 0.75 mils. The insert is also tested under the B conditions shown in Example 7. After 15 minutes cutting time under the B conditions the flank wear on the insert is 4 mils and the crater depth is 0.5 mils.

In addition, the insert is tested under the following conditions: The speed is about 370 surface feet per minute, the depth of cut is 1/8″ and the feed is 0.030″. The material being cut is 4340 steel. These conditions are referred to as the C conditions. After 1 minute cutting time under the C conditions the flank wear on the insert is found to be 4 mils and no crater is formed.

Example 9

Ninety-one parts of finely divided titanium nitride, 16.6 parts of finely divided aluminum nitride, 67.2 parts of finely divided tungsten carbide and 25.4 parts of finely divided cobalt are ballmilled together, and recovered as a dry powder as in Example 8. The resulting powder contains about 5.6 parts by volume titanium nitride, 1.9 parts by volume aluminum nitride, and 1.5 parts by volume tungsten carbide per part by volume of cobalt. The refractory phase thus contains about 62 volume percent titanium nitride, 21 volume percent aluminum nitride and 17 volume percent tungsten carbide.

Twenty-five parts of this powder is hot pressed and the resulting disc cut up and tested as in Example 8. The Rockwell A hardness is 92.1 and the density is 6.77 g./cc. The cutting tool insert fashioned from this disc is tested under the A conditions shown in Example 5. After 3 minutes cutting time the flank wear is 8 mils and the crater depth is 1.5 mils. This insert is tested under the B conditions specified in Example 7. After 15 minutes cutting time the flank wear on this insert is 4 mils and the crater depth is 1.5 mils. The insert is also tested under the C conditions shown in Example 8. After 1 minute cutting time under the C conditions the flank wear is only 4 mils and the crater depth is 1 mil.

Example 10

Finely divided titanium nitride, aluminum nitride, tungsten carbide and cobalt are ballmilled together as in Example 9 in the following quantities: 120.9 parts of titanuim nitride, 22.5 parts of aluminum nitride, 99.9 parts of tungsten carbide and 56.7 parts of cobalt. The product is separated from the oil as in Example 5. The powder composition contains about 3.5 parts by volume titanium nitride, 1.2 parts by volume aluminum nitride, and 1 part by volume tungsten carbide per part by volume of cobalt. The refractory phase thus contains about 61 volume percent titanium nitride, 21 volume percent aluminum nitride, and 18 volume percent tungsten carbide.

Thirty parts of this powder is hot pressed as in Example 5, except that the temperature is first raised to 1850° C. and maintained at this temperature for 5 minutes. The temperature is then lowered to 1750° C. and a pressure of 4000 p.s.i. is applied. The sample is maintained under these conditions for 2 minutes, after which power is shut off and the carbon mold removed from the furnace cavity.

The resulting disc is cut up and its physical properties are measured as in Example 5. The average transverse rupture strength observed is 145,000 p.s.i, the Rockwell A hardness is 92.0 and the density is 5.83 g./cc.

A standard cutting tool insert fashioned from a portion of the disc is tested under the A conditions shown in Example 5, on a high speed lathe. After 3 minutes cutting time the wear on the flank of this tool is 4 mils and the crater depth is 0.5 mils. The insert is also tested under the B conditions shown in Example 7. After 15 minutes cutting time the flank wear is 3 mils and the crater depth is 0.5 mils. Tested under the C conditions of Example 8, the insert shows a flank wear of 2 mils and no crater wear after 1 minute cutting time.

Example 11

One hundred and three parts of finely divided titanium nitride, 19.3 parts of finely divided aluminum nitride, 49.6 parts of finely divided tungsten carbide and 28.1 parts of finely divided cobalt are ballmilled as in Example 5, except that the milling time is 90 hours. The product is separated from the oil by vacuum distillation. The product contains about 6 parts by volume titanium nitride, 2 parts by volume aluminum nitride, and 1 part by volume tungsten carbide per part by volume of cobalt. The refractory phase thus contains about 67 volume percent titanium nitride, 22 volume percent aluminum nitride, and 11 volume percent tungsten carbide.

Twenty-five parts of the resulting powder is loaded to a carbon mold and hot pressed as in Example 5, except that the temperature is first raised to 1000° C. and maintained at this temperature for 3 minutes. The temperature is then raised to 1850° C. and the sample maintained at this temperature for 5 minutes. A pressure of 4000 p.s.i. is then applied and the sample is held under this pressure at 1850° C. for an additional 2 minutes, after which power is shut off and the sample removed from the furnace cavity.

The resulting disc is cut up for testing as in Example 5. The average transverse rupture strength is 201,000 p.s.i., the Rockwell A hardness is 91.3 and the density is 5.98 g./cc.

A standard cutting tool insert is fashioned from a portion of this disc and is tested on 4340 steel on a high speed lathe under the A conditions specified in Example 5. After 3 minutes cutting time, the flank wear on the insert is 6 mils and the crater depth is 1 mil. When tested under the C conditions specified in Example 8, after 1 minute cutting time the flank wear is 2 mils and the crater depth is 0.5 mils.

Example 12

A steel ballmill is loaded with 76 parts of a finely divided titanium nitride powder, 13 parts of a finely divided aluminum nitride powder, 10 parts of finely powdered molybdenum metal, and 8.6 parts of finely divided nickel metal. 5,990 parts of 6% cobalt tungsten carbide rod inserts of Example 5 are also placed in the mill, along with 259 parts of a high boiling hydrocarbon oil having a flash point of 130° C. The titanium nitride powder has a crystallite size of 700 millimicrons as determined by nitrogen surface area, and contains 21% nitrogen and 1.15% oxygen. The nickel powder has a size of 1.3 microns as determined by nitrogen surface area and an X-ray crystallite size as determined by X-ray line broadening of 160 millimicrons. The molybdenum is also very fine, having a surface area of 1.3 m.$^2$/g. and an X-ray crystallite size of 79 millimicrons.

The above mixture is ballmilled on rubber-lined rollers at 85 r.p.m. for 5 days. Recovery of the product is effected by transferring the slurry from the ballmill into a resin kettle, allowing the slurry to settle out from the hydrocarbon oil, and siphoning off the supernatant liquid. The wet cake is then dried under a vacuum of 0.5 mm. of mercury, at about 250° C. When dry, the resin kettle is opened to an inert atmosphere within a nitrogen-filled dry box and the product is screened through a 70 mesh screen (U.S. Sieve size). Chemical analysis and weighing of the balls and the mill indicate that 4.2 parts of the tungsten carbide ball material and 3.5 parts of iron from the steel mill have been incorporated into the product in the form of a finely divided powder. The volume composition of this powder is 67.6% titanium nitride, 19.3% aluminum nitride, 5.0% molybdenum, 4.7% nickel, 1.4% tungsten carbide, and 2.2% iron which corresponds to 5.7 parts by volume titanium nitride, 1.6 parts by volume aluminum nitride, and 0.1 part by volume tungsten carbide per part by volume of metal. The refractory phase consists of about 76.5 volume percent titanium nitride, 21.9 volume percent aluminum nitride, and 1.6 volume percent tungsten carbide.

Since the solubility of molybdenum in the nickel-iron alloy phase is approximately 25%, this composition represents one in which the total metal phase comprising molybdenum, nickel, and iron consists of 70% by volume of a ductile single phase alloy of iron, nickel and molybdenum with a 30% by volume excess beyond the solubility limit at 600° C. of additional molybdenum metal.

This composition is inserted into a graphite mold with graphite plungers capping the ends, and is raised to a temperature of 1600° C. in an induction furnace using a 45 kilowatt power input. The time required to heat the sample to 1600° C. is 8 minutes and it is allowed to sinter in the mold for a period of 3 minutes after reaching temperature. A pressure of 4000 pounds per square inch is then imposed for a period of 4 minutes, and the resulting dense, hot pressed composition is ejected from the hot zone.

This refractory interdispersion is then cut with a diamond saw to give specimens for testing transverse rupture strength, hardness on the Rockwell A scale, and a section is machined in the form of a metal cutting tool insert having the dimensions ½" x ½" x ⅜₆". The transverse rupture strength of this material is found to be 220,000 p.s.i., and when used to turn 4340 steel having a Brinell hardness of 330 at a speed of 575 surface feet per minute, a feed of .02 inch per revolution and a depth of cut of 0.05", the tool performs in an outstanding fashion for a period in excess of 3.5 minutes.

Example 13

Ninety-seven and eight tenths parts of the titanium nitride of the previous example and 24 parts of a finely divided alpha alumina having a crystallite size of approximately ½ micron are loaded into a mill as described in the previous example, along with 28.8 parts of molybdenum, 28.2 parts of nickel, 5,890 parts of tungsten carbide cobalt inserts and 235 parts of a high boiling hydrocarbon oil. After milling in a fashion identical to that described in the last example, for a period of 5 days, it is found that the composition has picked up a contamination of 2.1 parts of tungsten carbide from the inserts and 2.2 parts of iron from the mill. Recovery and preparation of the powder proceeds as in the previous example, and the final volume composition is determined to be 59.2% titanium nitride, 19.7% $Al_2O_3$, 9.0% molybdenum, 10.6% nickel, 0.9% iron, and 0.5% tungsten carbide. This corresponds to 2.9 parts by volume titanium nitride, 0.9 part by volume alumina and 0.02 part by volume tungsten carbide per part by volume of metal. The refractory phase thus contains about 74.6 volume percent titanium nitride, 24.8 volume percent alumina and 0.6 volume percent tungsten carbide. As in the previous example, the metal phase consists of approximately 70% by volume of a ductile, single phase nickel-molybdenum-iron alloy with somewhat less than 30% by volume in excess of this solubility limit of additional molybdenum metal. This interdispersion is pressed as in the previous example, with the exception that the pressure of 4000 p.s.i. is only applied for a period of 1 minute. The pressed composition has a transverse rupture strength of 83,000 p.s.i., a Rockwell A hardness of 90.3, and also is an excellent cutting tool. For example, at a cutting speed of 500 s.f./m., a feed of 0.22 i.p.r., and 0.05" depth of cut, it exhibits a flank wear of only 0.5 mil and a crater wear of 8 mils after one minute of cutting under these conditions.

Example 14

A composition is prepared using the materials described in Example 12, and using the same process in all respects. It has a final volume composition of 70% titanium nitride, 20% aluminum nitride, and 10% of a nickel-molybdenum alloy, 70% of which is a ductile, solid solution of molybdenum and nickel, and 30% of which is molybdenum in excess of the solid solubility limit in nickel at 600° C. This composition corresponds to 7 parts by volume of titanium nitride and 2 parts by volume of aluminum nitride per part by volume of metal.

The refractory phase thus contains about 78 volume percent titanium nitride and 22 volume percent aluminum nitride. After hot pressing as in Example 12, this composition has a transverse rupture strength of 154,000 p.s.i., A Rockwell A hardness of 91.7, and is an excellent cutting tool on 4340 steel under conditions where conventional titanium carbide-based or tungsten carbide tools would not perform satisfactorily at all.

Example 15

A composition is prepared in an identical fashion to that described above, having the volume composition of 50% titanium nitride, 5% aluminum nitride, and 15% $Al_2O_3$, with 30% of a metal phase which is 68% by volume nickel and 32% by volume tungsten. This is approximately the solid solubility limit for tungsten in nickel at 600° C., as shown by the phase diagram. This composition corresponds to about 1.7 parts by volume titanium nitride, 0.17 part by volume aluminum nitride and 0.5 part by volume alumina per part by volume of metal. The refractory phase is thus composed of about 71.4 volume percent titanium nitride, 7.1 volume percent aluminum nitride and 21.4 volume percent alumina. The transverse rupture strength of this material is 123,000 p.s.i after pressing at 1600° C. under a pressure of 4000 p.s.i., as previously described. This interdispersion is also an excellent cutting tool on steel and shows low wear under conditions of 590 s.f./m., 0.01 i.p.r. feed, and 0.05 depth of cut.

Example 16

This example describes the preparation of a composition containing 4 parts by volume of a particulate phase of tantalum nitride and zirconium nitride, each nitride constituting 50% by volume of the particulate phase, interdispersed in a metal matrix of a cobalt-iron alloy with each metal constituting 50% by volume of the alloy. The composition thus contains 2 parts by volume of tantalum nitride and 2 parts by volume of zirconium nitride per part by volume of metal.

Sixty-five and one tenth parts of the tantalum nitride having a crystallite size of about 0.3 micron, 28.3 parts of a 40 millimicron nitride powder, 6.06 parts of −325 mesh iron powder, and 8.90 parts of cobalt metal powder produced by the decomposition of cobalt carbonyl having a particle size of about one micron, are loaded into a rubber-lined steel mill which contains 2200 parts of ⅜ inch diameter steel balls and 260 parts of a high boiling hydrocarbon solvent. The mill is rotated at a speed of 60 revolutions per minute for a period of 24 hours, after which the intimately mixed powders of tantalum nitride, zirconium nitride, iron and cobalt are separated from the steel balls and washed free of oil as described in previous examples.

Twenty-five parts of this composition are hot pressed at a temperature of 1800° C. under 4000 pounds per square inch pressure, the pressure being first applied at 1400° C. The time of pressing at 1800° C. is five minutes.

The resulting refractory interdispersion of this invention is found to be useful as a cutting tool on steel and has high hardness and good transverse rutpure strength.

I claim:

1. A dense interdispersion consisting essentially of from 3 to 50 parts by volume of a refractory phase bonded with one part by volume of a binder metal selected from the group consisting of iron, cobalt, nickel and their alloys, said refractory phase consisting essentially of from 20 to 95 volume percent of an essential nitride selected from the group consisting of titanium nitride, zirconium nitride, hafnium nitride, niobium nitride, vanadium nitride and their mixtures, and from 5 to 80 volume percent of a wear-resistant additive selected from the group consisting of aluminum nitride, tantalum nitride, alumina and their mixtures, said interdispersion having a density of at least 98% of its theoretical density, and the components having an average grain size of less than 10 microns.

2. A dense interdispersion of claim 1 in which up to one-half of the volume of the essential nitride is replaced by a compound selected from the group consisting of the nitrides of beryllium, magnesium, boron, uranium, cerium and thorium and the carbides of titanium, zirconium, tungsten, molybdenum, chromium, tantalum and niobium and their mixtures, with the limitation that the resplacement cannot be in an amount which would take the essential nitride content of the refractory phase below 20 volume percent.

3. A dense interdispersion of claim 1 in which the essential nitride and binder metals are both present as continuous, three-dimensional, interpenetrating networks.

4. A dense interdispersion of claim 1 in which the binder metal is selected from the group consisting of iron, cobalt, nickel, their alloys with each other, and their alloys with minor amounts of a metal selected from the group consisting of molybdenum, tungsten and chromium.

5. A dense interdispersion of claim 1 in which the binder metal is selected from the group consisting of cobalt and an alloy of nickel with minor amounts of molybdenum.

6. A dense interdispersion of claim 1 in which the binder metal is selected from the group consisting of cobalt and an alloy of nickel with minor amounts of molybdenum, the refractory phase consists essentially of from 20 to 95 volume percent of an essential nitride selected from the group consisting of titanium nitride, zirconium nitride, hafnium nitride, niobium nitride, vanadium nitride and their mixtures, and from 5 to 80 volume percent of a wear-resistant additive selected from the group consisting of aluminum nitride, tantalum nitride, alumina and their mixtures, provided that up to one half of the volume of the essential nitride is replaced by a compound selected from the group consisting of the nitrides of beryllium, magnesium, boron, uranium, cerium, and thorium and the carbides of titanium, zirconium, tungsten, molybdenum, chromium, tantalum and niobium and their mixtures, with the limitation that the replacement compound is not used in an amount which would take the essential nitride content of the refractory phase below 20 volume percent, the average grain size of the binder metal and the refractory components being smaller than 10 microns, and the binder metal and essential nitride being present as continuous, three-dimensional, interpenetrating networks.

References Cited

UNITED STATES PATENTS

| | | | |
|---|---|---|---|
| 1,895,959 | 1/1933 | Agte | 29—182.5 |
| 2,040,592 | 5/1936 | Becker | 29—182.5 |
| 2,077,239 | 4/1937 | Hinnuber | 29—182.5 |
| 2,108,618 | 2/1938 | Seljaester | 29—182.5 |
| 2,929,126 | 3/1960 | Bollack et al. | |
| 3,000,734 | 9/1961 | Grant et al. | 29—182.5 |
| 3,262,763 | 7/1966 | Bechtold | 75—205 |

FOREIGN PATENTS

| | | |
|---|---|---|
| 395,134 | 7/1933 | Great Britain. |
| 1,041,410 | 10/1958 | Germany. |

OTHER REFERENCES

"High-temperature Bodies Derived from Mixtures of MgO-TiN-NiO," Hower et al.: Journal of the American Ceramic Society, vol. 34, No. 10, October 1951, pp. 309–313.

CARL D. QUARFORTH, *Primary Examiner.*

R. L. GRUDZIECKI, *Assistant Examiner.*